US008138882B2

(12) United States Patent
Do et al.

(10) Patent No.: US 8,138,882 B2
(45) Date of Patent: Mar. 20, 2012

(54) SECURING PREMISES USING SURFACED-BASED COMPUTING TECHNOLOGY

(75) Inventors: Lydia Mai Do, Research Triangle Park, NC (US); Travis M. Grigsby, Austin, TX (US); Pamela Ann Nesbitt, Ridgefield, CT (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 12/365,922

(22) Filed: Feb. 5, 2009

(65) Prior Publication Data

US 2010/0194525 A1 Aug. 5, 2010

(51) Int. Cl.

| | |
|---|---|
| ***G05B 19/00*** | (2006.01) |
| ***G08B 23/00*** | (2006.01) |
| ***G08B 21/00*** | (2006.01) |
| ***G08B 25/00*** | (2006.01) |

(52) U.S. Cl. .... 340/5.1; 340/5.2; 340/573.3; 340/573.4; 340/665; 340/666; 340/524

(58) Field of Classification Search ............... 340/573.1, 340/573.3, 573.4, 539.12, 5.1, 5.2, 665, 666, 340/524

See application file for complete search history.

(56) References Cited

U.S. PATENT DOCUMENTS

| | | | | |
|---|---|---|---|---|
| 4,780,706 | A * | 10/1988 | Bollag | 340/666 |
| 2008/0191864 | A1 * | 8/2008 | Wolfson | 340/524 |
| 2009/0091529 | A1 * | 4/2009 | Do et al. | 345/156 |

* cited by examiner

*Primary Examiner* — Benjamin C Lee
*Assistant Examiner* — Omeed Alizada
(74) *Attorney, Agent, or Firm* — VanLeeuwen & VanLeeuwen; Jeffrey S. LaBaw

(57) ABSTRACT

An approach is provided that that uses an electronic multi-touch floor covering that has numerous sensors to identify shapes. The electronic multi-touch floor covering identifies a shape of an object that is in contact with the surface of the electronic multi-touch floor covering. An entity record is then retrieved from a data store, such as a database, with the retrieved entity record corresponding to the identified shape. Actions are then retrieved from a second data store with the actions corresponding to the retrieved entity record. The retrieved actions are then executed by the computer system.

3 Claims, 9 Drawing Sheets

SECURING PREMISES USING SURFACED-BASED COMPUTING TECHNOLOGY

BACKGROUND OF THE INVENTION

1. Technical Field

The present invention relates to an approach for securing a premises. More particularly, the present invention relates to an approach that secures a premises.

2. Description of the Related Art

Premises security systems, such as systems used in homes and commercial locations are primarily designed to prevent intrusion or burglaries. Components, such as photo-infrared motion sensors, ultrasonic detectors, microwave detectors, photo-electric beams, glass break detectors are commonly used to detect when someone enters, or attempts to enter, a premises and the system is "on," or "armed." When the intrusion detection system is armed and intrusion is detected, actions can be performed such as sounding an audible alarm, flashing emergency lights, and contacting public safety officials via telephone. Traditional systems, however, are either "on" or "off." When "on" an authorized person, such as the homeowner, can trip the alarm system if they fail to disarm the alarm before entering. This causes an abundance of "false alarms" that are annoying to neighbors and waste valuable public safety resources investigating such false alarms.

SUMMARY

It has been discovered that the aforementioned challenges are resolved using an approach that uses an electronic multi-touch floor covering that has numerous sensors to identify shapes. The electronic multi-touch floor covering identifies a shape of an object that is in contact with the surface of the electronic multi-touch floor covering. An entity record is then retrieved from a data store, such as a database, with the retrieved entity record corresponding to the identified shape. Actions are then retrieved from a second data store with the actions corresponding to the retrieved entity record. The retrieved actions are then executed by the computer system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
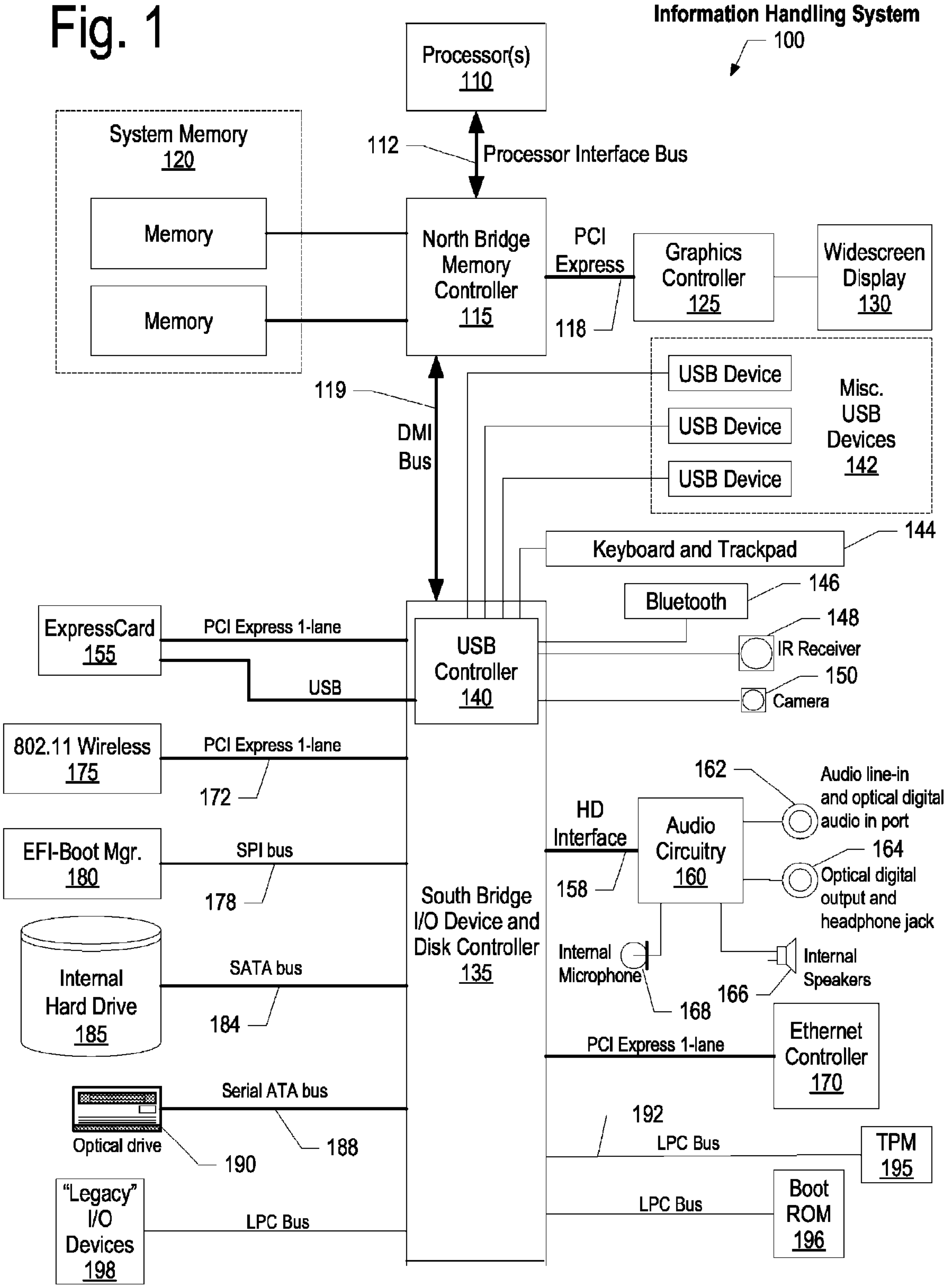
FIG. 1 is a block diagram of a data processing system in which the methods described herein can be implemented.
Figure 2:
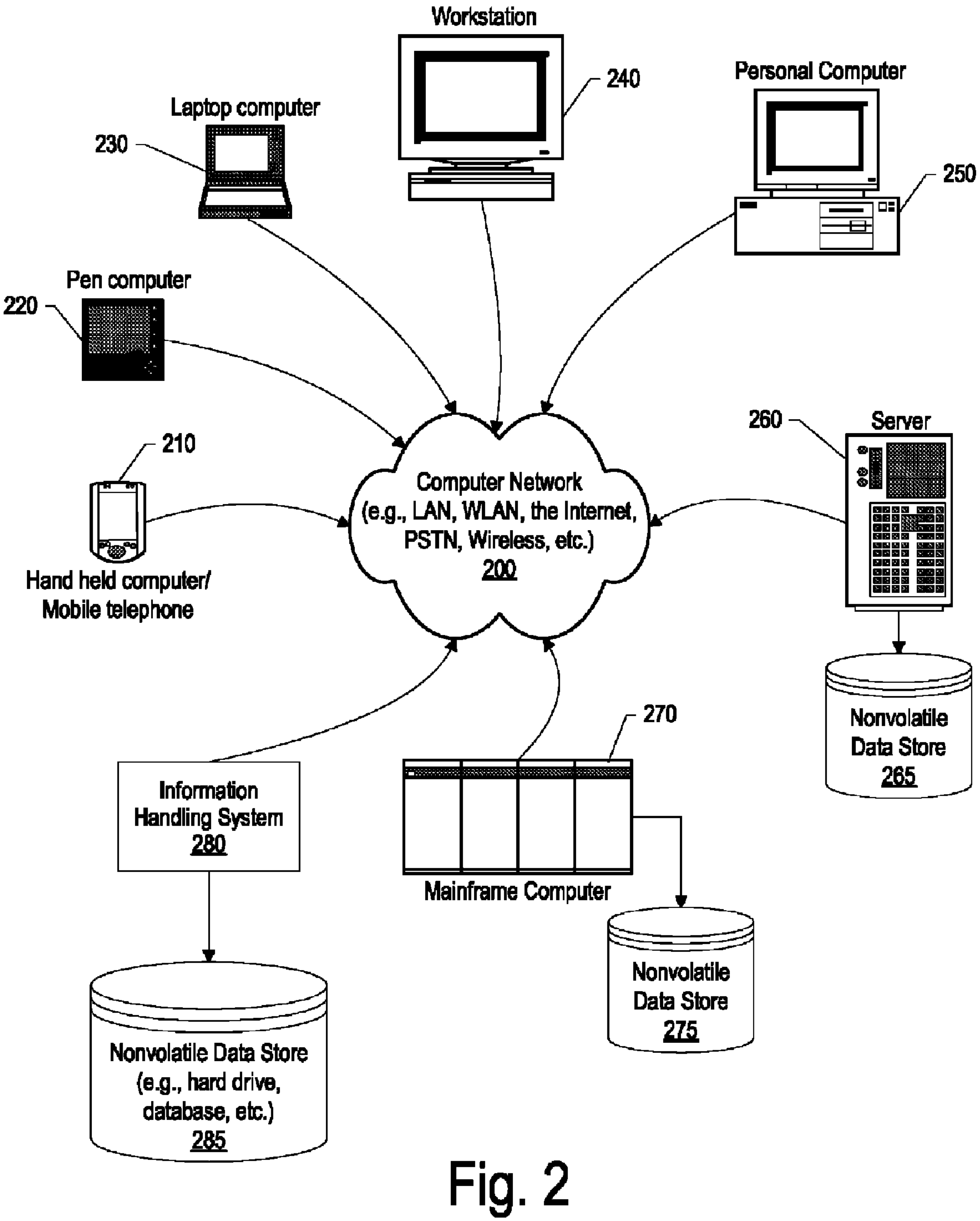
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge

135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
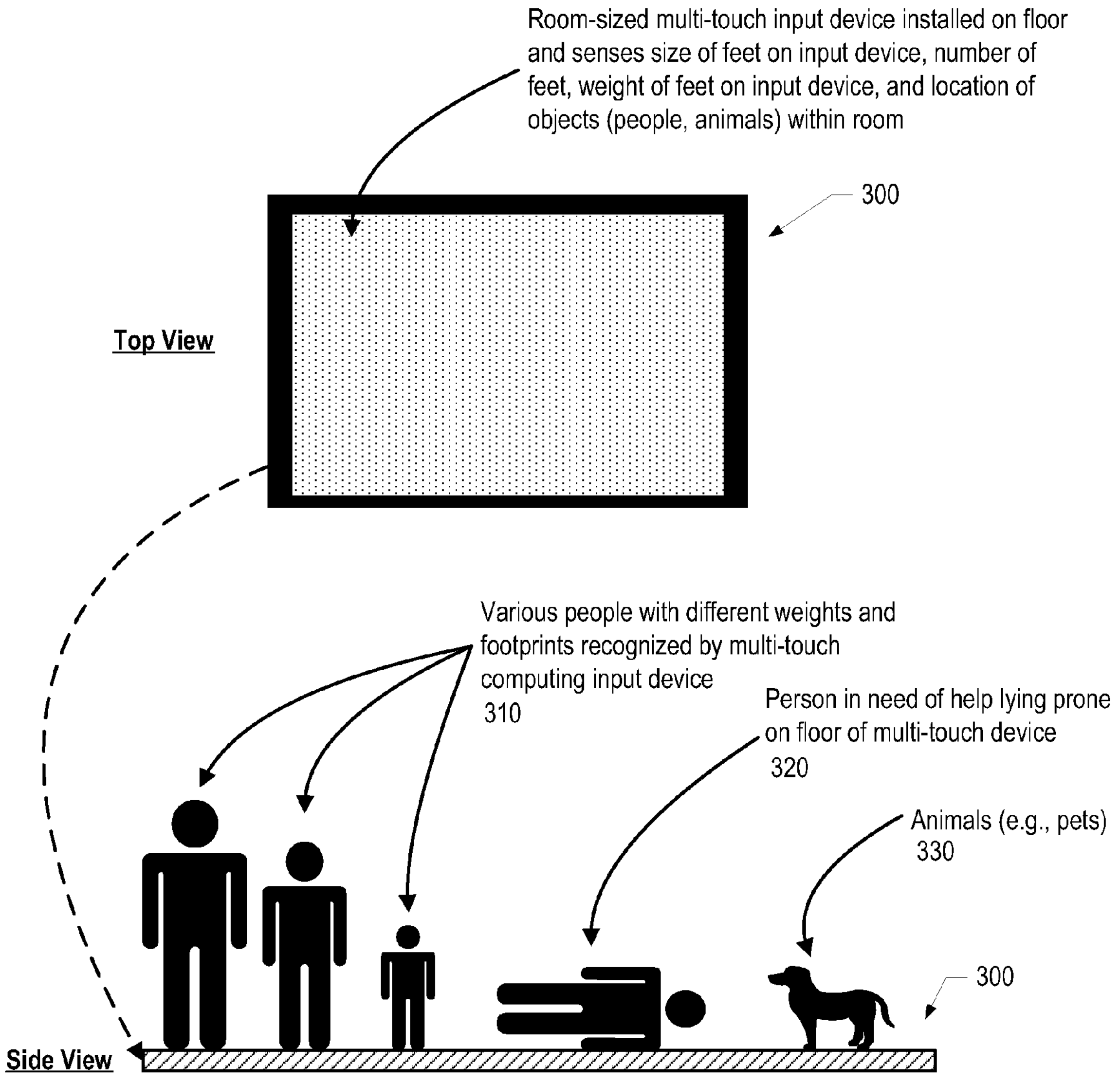
FIG. 3 is a diagram depicting a multi-touch floor covering used to sense attributes of entities, such as people and pets, at a premises.

FIG. 3 is a diagram depicting a multi-touch floor covering used to sense attributes of entities, such as people and pets, at a premises. Electronic multi-touch floor covering 300 is installed on the floor of the premises where the system is installed. Electronic multi-touch floor covering 300 is a surface computing platform that responds to objects and senses users' movements above the surface. In one embodiment, the system uses a vision system with multiple cameras that enable interaction with the floor-based system using body movements, such as foot movement, hand movement, as well as interaction with objects, such as non-animated objects (e.g., chairs, tables, etc.) as well as living objects such as pets. Objects can include people 310 that are standing so that electronic multi-touch floor covering 300 captures the shape of the person's foot. Objects can also include people lying in a prone position 320, such as an elderly person that is lying in the middle of a living room and therefore might need help or assistance. Objects can also include animals, such as pets (dogs, cats, etc.).

The system takes different actions based upon identifying which object is in a particular location. For example, if the system senses that a small child is in an "off-limits" location, such as a swimming pool or hot tub area, the child's caregiver can immediately be notified to prevent the child from getting hurt. Similarly, if the system senses that the family dog has entered an area that is off-limits, such as a living room or bedroom, actions can be taken accordingly. If the owner is home, the owner can be notified with an alert in order to remove the dog from the off-limits location. If no one is home, a high-pitched dog alarm can be sounded in order to have the dog retreat from the off-limits location.

Figure 4:
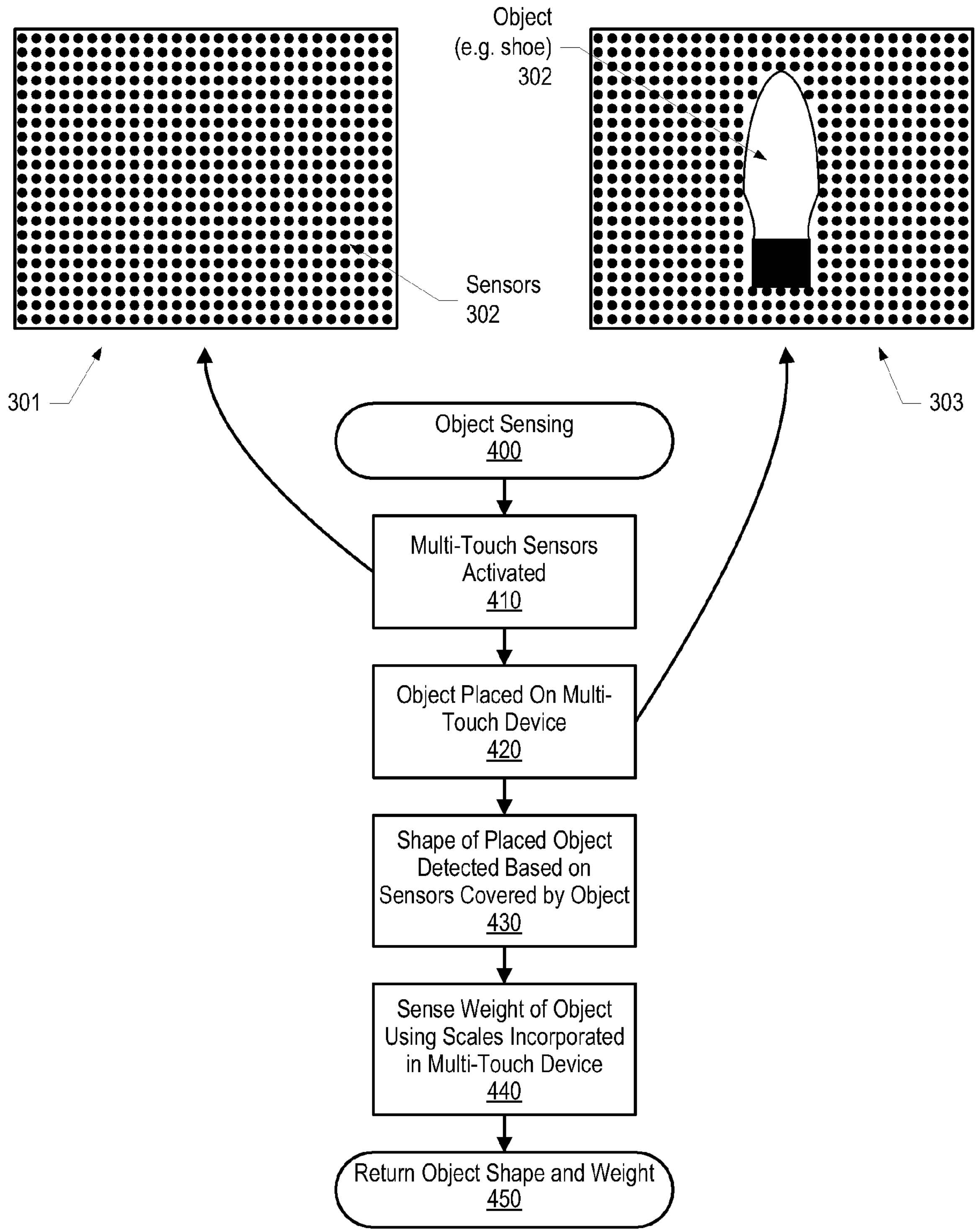
FIG. 4 is a flowchart and diagram showing object and entity sensing using the multi-touch floor covering shown in FIG. 3.

FIG. 4 is a flowchart and diagram showing object and entity sensing using the multi-touch floor covering shown in FIG. 3. Floor area 301 shows a portion of the electronic multi-touch floor covering with a detailed view of sensors 302. Floor area 303 depicts an object, in this case a shoe of a particular size, on part of the electronic multi-touch floor covering. The electronic multi-touch floor covering senses the size of the object based upon the sensors that are covered by the object. The electronic multi-touch floor covering can also sense the weight of the object using electronic scales built into the electronic multi-touch floor covering. More sensors are used for more accurate object sensing.

Object sensing processing commences at 400 whereupon, at step 410, the multi-touch sensors 302 are activated for the room or area that is being monitored (e.g., for a particular area, for an entire premises, etc.). At step 420, an object, such as a shoe, is placed on the electronic multi-touch floor covering (e.g., a person walks over part of the electronic multi-touch floor covering that has been activated, etc.). At step 430, the shape of the object that has been placed over part of the electronic multi-touch floor covering is detected based upon the number and pattern (shape) of sensors that have been covered by the object. At step 440, the weight of the object that was placed on the electronic multi-touch floor covering is also detected using electronic scales built into the electronic multi-touch floor covering. The weight detected at the sensors that are proximate to the sensors covered by the object are read by the system in order to sense the weight of the object. At step 450, the object's shape and weight are returned to the calling routine.

Figure 5:
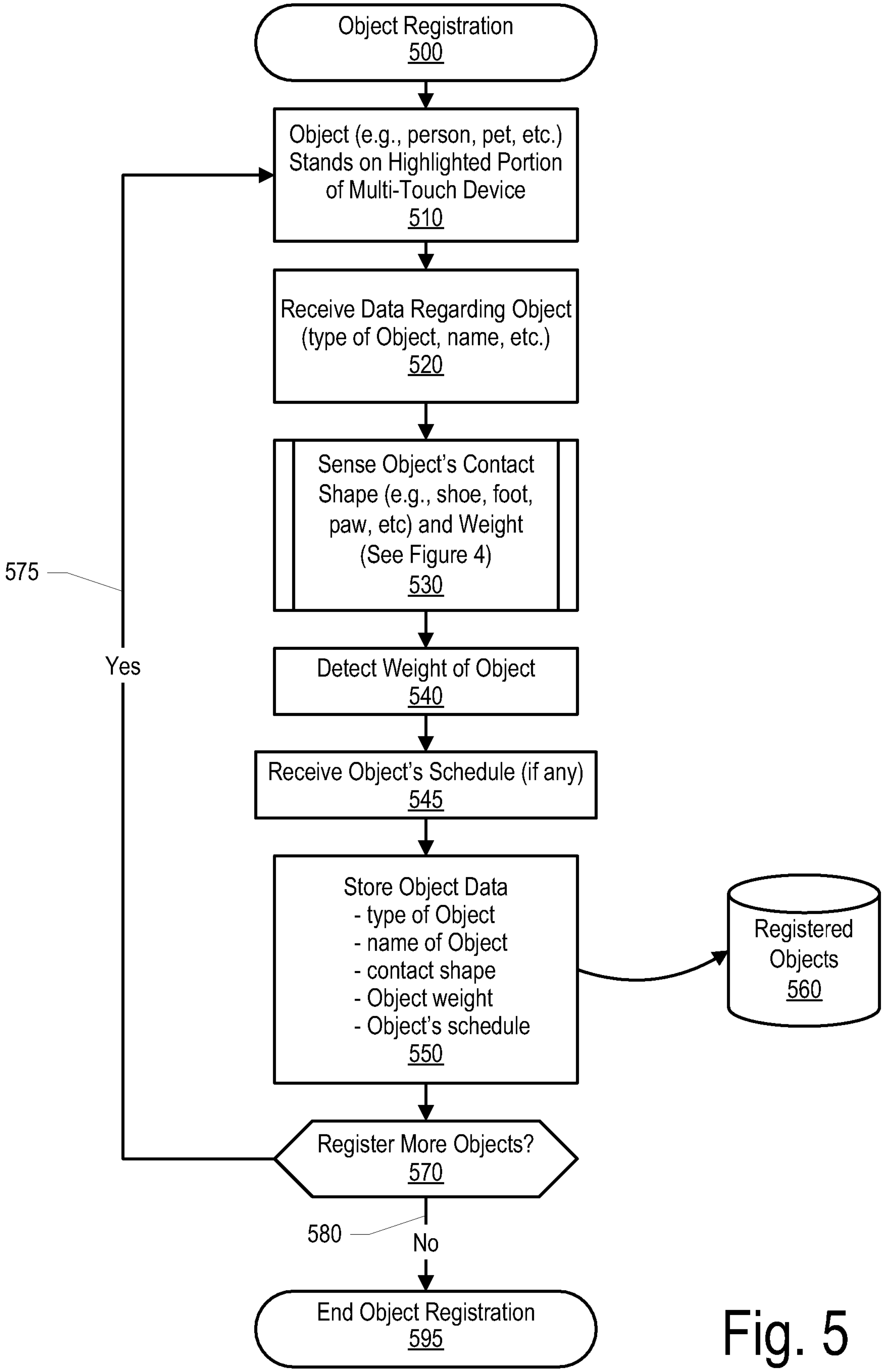
FIG. 5 is a flowchart showing steps taken to register an entity to the system for future identification and responsive actions.

FIG. 5 is a flowchart showing steps taken to register an entity to the system for future identification and responsive actions. Processing commences at 500 whereupon, at step 510, the object that is being registered, such as a person, a family pet, etc., stands on a highlighted portion of the electronic multi-touch floor covering. At step 520, data concerning the object is entered into the system, including the object's name, the type of entity, and any other data relevant to the entity. At predefined process 530, the object's contact shape (e.g., shoe, foot, paw, etc.) is sensed and retrieved (see FIG. 4 and corresponding text for processing details). At step 540, the object's weight is detected and retrieved. At step 545, an optional schedule is received for the object. For example, an object that is a person that works away from the premises during the work week might have a schedule indicating that the object is not present during those hours. This schedule can then be used for security actions and other actions by ascertaining when the object (person) is supposed to be at the premises and when the object is not supposed to be present.

At step 550, the data gathered (the type of object, the name of the object, the object's contact shape, the object's weight, and the object's schedule) are stored in registered objects data store 560. When an object is sensed on the electronic multi-touch floor covering, registered objects data store 560 is used to determine if the object is known (registered) to the system. If the object is registered (a known object), then actions can be taken based on the particular individual. A determination is made as to whether there are more objects being registered (decision 570). If there are more objects being registered, then decision 570 branches to "yes" branch 575 which loops back to gather data regarding the next object. On the other hand, when there are no further objects to register, then decision 570 branches to "no" branch 580 and object registration processing ends at 595.

Figure 6:
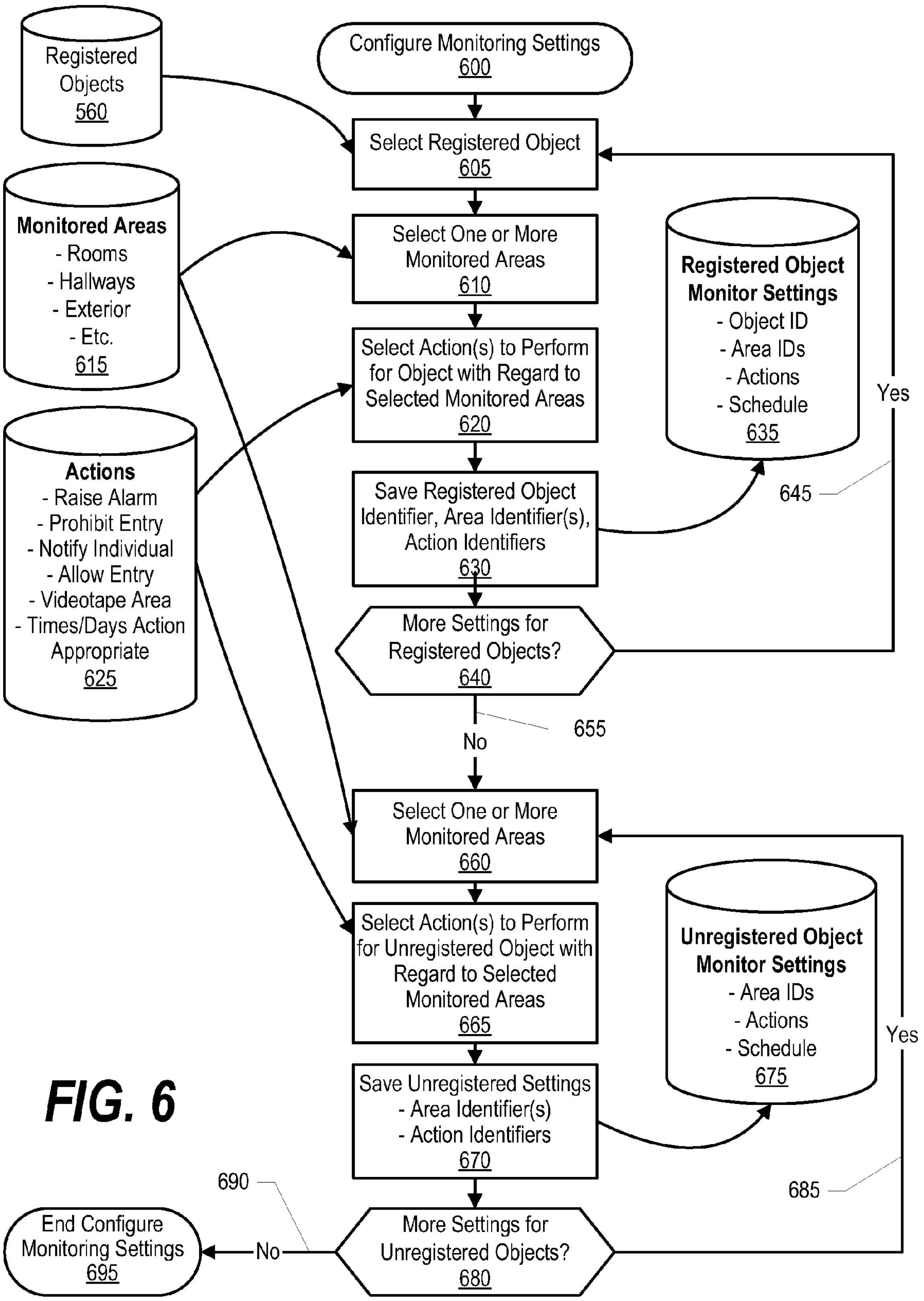
FIG. 6 is a flowchart showing steps taken to configure the monitoring settings used by the multi-touch floor covering system.

FIG. 6 is a flowchart showing steps taken to configure the monitoring settings used by the multi-touch floor covering system. Processing commences at 600 whereupon, at step 605 a registered object is selected from registered objects data store 560. At step 610, one or more monitored areas (e.g., areas with electronic multi-touch floor covering installed, such as living areas, bedrooms, hallways, etc.) are selected from monitored areas data store 615. At step 620, the user selects one or more actions to perform when the selected object enters the selected areas. These actions are selected from actions data store 625. Examples of actions include raising an alarm, prohibiting entry (e.g. locking a door before object able to enter area), notifying an individual, allowing entry (e.g., unlocking a door), turning on lights, turning on video recording device, and a selection of the days and/or times when the action is performed. At step 630, the registered object (e.g., the object's unique identifier), the area identifiers, and the action identifiers are stored along with any scheduling information that pertains to the action being performed are stored in registered object monitor settings data store 635. A determination is made as to whether there are more monitor settings to establish for registered objects (decision 640). If there are more settings to establish for registered objects, then decision 640 branches to "yes" branch 645 which loops back to select the next registered object. This looping continues until there are no further settings to establish for registered objects, at which point decision 640 branches to "no" branch 655.

Steps 660 to 680 are used to establish monitor settings for unregistered objects. At step 660, one or monitored areas are selected from monitored areas data store 615. At step 665, the user selects one or more actions to perform when an unregistered object enters the selected areas. These actions are selected from actions data store 625. For security purposes, for example, the entire premises can be set to alarm if an unregistered entity is present after a particular time (e.g., after 10:00 pm). In this manner, registered objects, such as family members, could walk about the premises without raising an alarm, but an unregistered object would cause an alarm to sound. At step 670, the unregistered object settings are stored. The monitored area identifiers, and the action identifiers are stored along with any scheduling information that pertains to the action being performed are stored in unregistered object monitor settings data store 675. A determination is made as to whether there are more monitor settings to establish for unregistered objects (decision 680). If there are more settings to establish for unregistered objects, then decision 680 branches to "yes" branch 685 which loops back to select the next registered object. This looping continues until there are no further settings to establish for registered objects, at which point decision 680 branches to "no" branch 690 whereupon the configuration of monitor settings ends at 695.

Figure 7:
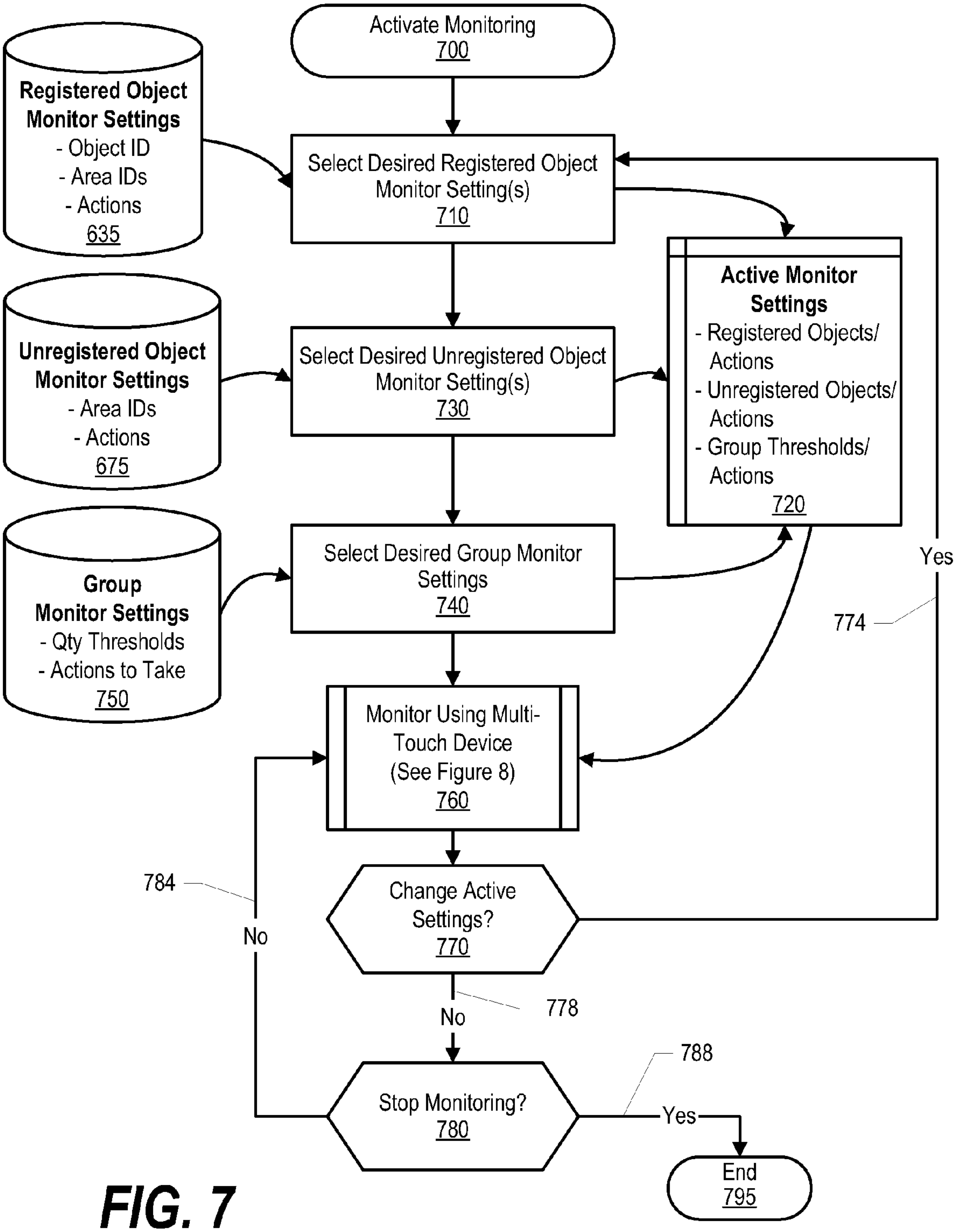
FIG. 7 is a flowchart showing steps taken to activate monitoring of entities detected on the multi-touch floor covering.

FIG. 7 is a flowchart showing steps taken to activate monitoring of entities detected on the multi-touch floor covering.

Processing commences at 700 whereupon, at step 710 the desired registered object monitor settings are selected from registered entity monitor settings data store 635 and at step 730 the desired unregistered object monitor settings are selected from unregistered entity monitor settings data store 675. These selected monitor settings are stored in active monitor settings memory area 720. The active monitor settings includes the registered objects and the respective actions to perform, and the unregistered objects and the respective actions to perform. In addition, at step 740, group monitor settings are selected from group monitor data store 750. Group monitor settings include quantity thresholds, and actions to take when the thresholds are reached or exceeded. For example, when the parents are away, a group quantity threshold could be set to six individuals so that if the parents' teenage children have a party with more than six individuals, an action (e.g., telephone the parents cell phone) can be taken alerting the parents of the party taking place at the residence. The selected group monitor settings are also stored in active monitor settings memory area 720.

At predefined process 760, the system monitors the premises (e.g., the area covered by the electronic multi-touch floor covering) and performs actions as needed. Periodically, the system checks if changes are being requested to the active settings (decision 770). If a change is being requested, decision 770 branches to "yes" branch 774 which loops back to receive the changes to the active monitor settings. On the other hand, if there is no change requested to the active monitor settings, then decision 770 branches to "no" branch 778. A determination is made as to whether an authorized user (e.g., a user presenting valid authentication data, such as a userid/password) is requesting to halt the monitoring (decision 780). If monitoring is not being stopped, then decision 780 branches to "no" branch 784 which loops back to continue monitoring the premises using the electronic multi-touch floor covering. On the other hand, if an authorized user requests a halt to the monitoring, then decision 780 branches to "yes" branch 788 whereupon active monitoring processing ends at 795.

Figure 8:
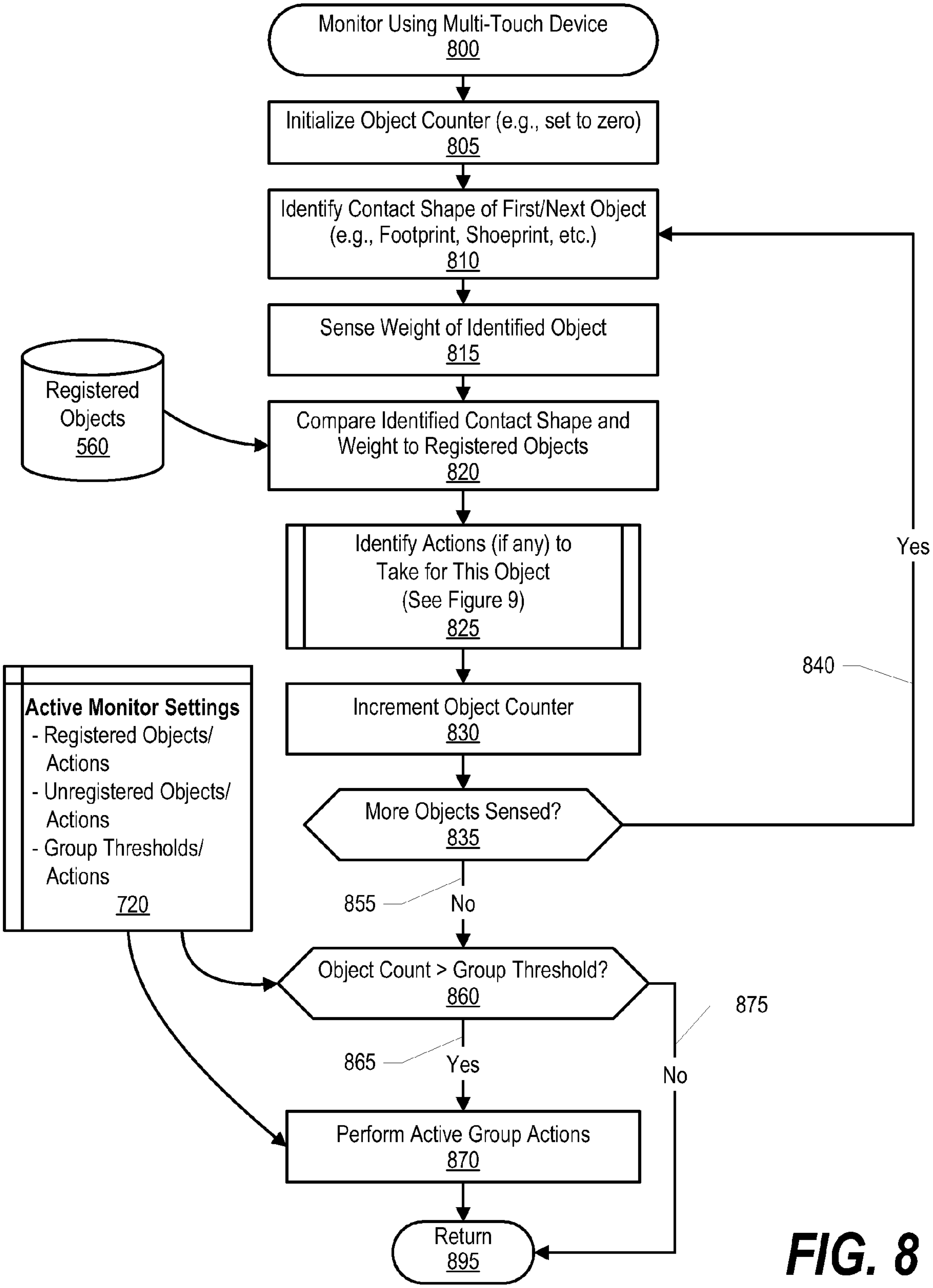
FIG. 8 is a flowchart showing steps taken by the multi-touch floor covering system to identify and monitor the presence of entities.

FIG. 8 is a flowchart showing steps taken by the multi-touch floor covering system to identify and monitor the presence of entities. Processing commences at 800 whereupon, at step 805, an object count is initialized (e.g., set to zero). The object count is used to count the number of objects at the premises (on the electronic multi-touch floor covering). At step 810, a first contact shape, such as a shoe, foot, paw, etc., is identified for a first object, such as an adult, child, pet, etc. At step 815, the weight of the object is sensed using the scale sensors built into the electronic multi-touch floor covering. At step 820, the contact shape of the object and the weight of the object are compared with the shapes and weights of registered objects stored in registered objects data store 560.

Figure 9:
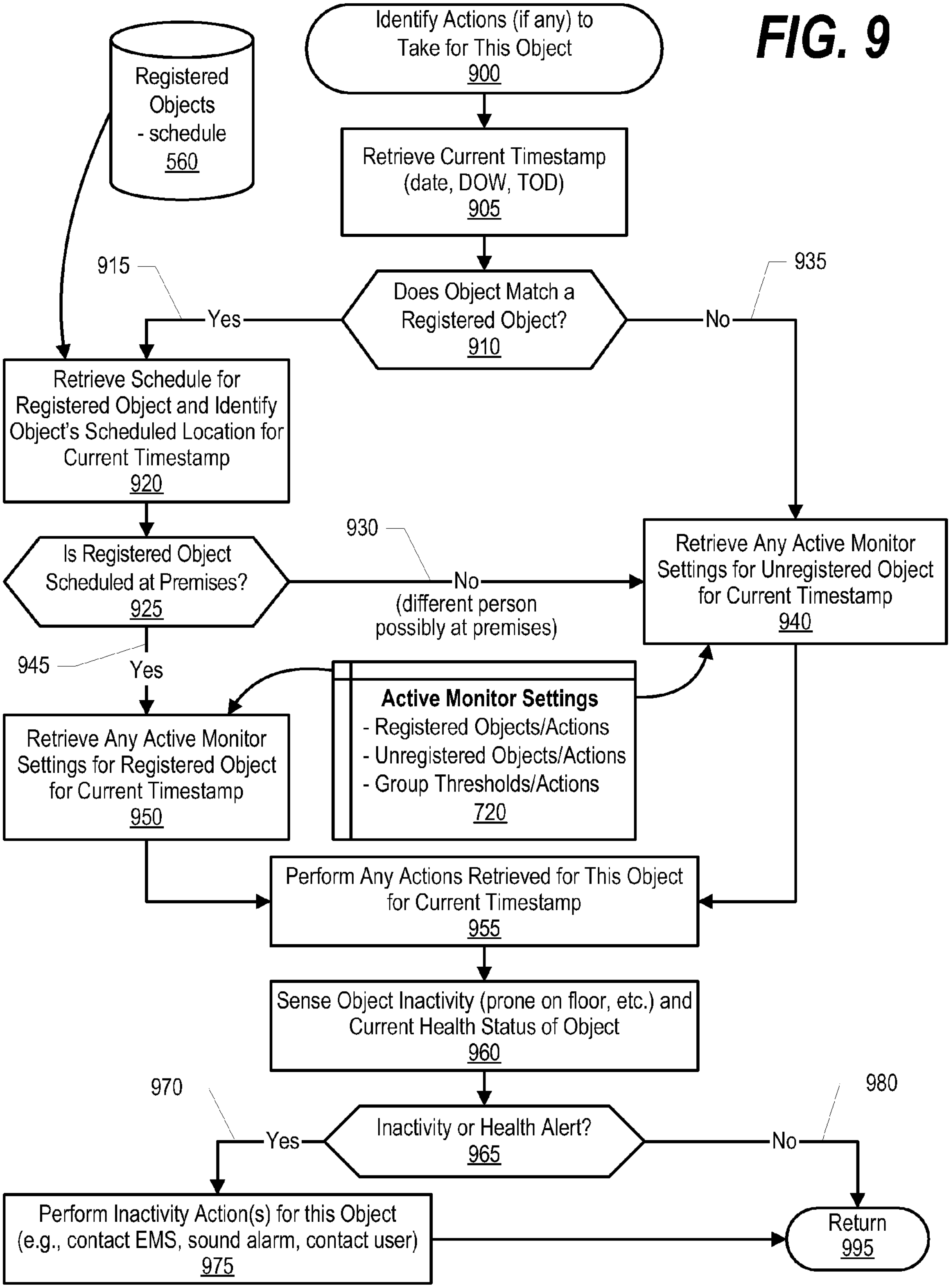
FIG. 9 is a flowchart showing steps taken by the system to identify actions to take when a particular entity is identified.

At predefined process 825, actions are identified that should be taken based upon the object that was sensed (see FIG. 9 and corresponding text for processing details). For example, if the object is not a registered object and the weight falls in the range of a possible teenage or adult intruder (e.g., over one hundred pounds, etc.), then intrusion-type actions can be taken, such as sounding an alarm or contacting police or other law enforcement. On the other hand, if the object is a child and the child is in an off-limits location, such as near a possibly dangerous item (e.g., a hot tub, pool, stove, etc.), then the action could be to alert a caretaker, such as a parent or guardian, so that the child can be moved to a safer location away from the dangerous item. Likewise, if the object is identified as a registered object based upon the contact shape and weight of the object, such as an adult living at the premises, then appropriate actions can be taken, such as not identifying the person as a possible intruder, notifying others, such as a spouse, that the person is on the premises, and performing any automation actions, such as turning on lights or unlocking doors, etc.

At step 830, the object counter is incremented (e.g., set to one when the first object is identified). A determination is made as to whether more objects are sensed on the electronic multi-touch floor covering installed in the premises (decision 835). If more objects are sensed, then decision 835 branches to "yes" branch 840 which loops back to identify the next object using steps 810 to 820, take any actions for the next identified object (predefined process 825) and increment the group counter (step 830). This looping continues until all of the objects sensed on the electronic multi-touch floor covering have been processed, at which point decision 835 branches to "no" branch 855.

A determination is made as to whether the number of objects sensed on the electronic multi-touch floor covering exceeds any thresholds included in active monitor settings memory area 720 (decision 860). If the number of objects exceeds any such thresholds, then decision 860 branches to "yes" branch 865 whereupon, at step 870, any active group actions that correspond to the counter value are performed. On the other hand, if the counter does not meet or exceed any group thresholds, then decision 860 branches to "no" branch 875 bypassing step 870. Processing then returns to the calling routine (e.g., the steps shown in FIG. 7) at 895.

FIG. 9 is a flowchart showing steps taken by the system to identify actions to take when a particular entity is identified. Processing commences at 900 whereupon, at step 905, the current time and date (timestamp) are retrieved from the computer system. Previously (see, e.g., FIG. 8, step 820), the object's contact shape and weight was compared to known (registered) objects. A determination is made as to whether, based upon the comparison, the object currently sensed matches a registered object (decision 910). If the object currently being sensed by the electronic multi-touch floor covering matches one of the registered objects, then decision 910 branches to "yes" branch 915 whereupon, at step 920, a schedule (if any is available) corresponding to the registered object is retrieved from registered objects data store 560 and, if a schedule is found for the registered entity, the object's scheduled location is found for the current timestamp. A determination is made as to whether the registered object is currently scheduled to be present at the premises (decision 925). If the object is not scheduled to be at the premises, then decision 925 branches to "no" branch 930. In one embodiment, at step 940, the object is treated as an unregistered object and active monitor settings (actions) are retrieved for such an unregistered object and performed accordingly (e.g., sound alarm, etc.). However, in another embodiment, an action is performed that requests that the person confirm his or her identity so that the active monitor settings can be retrieved and used (e.g., when a person arrives home early from work due to illness, etc.). Returning to decision 925, if the registered object (e.g., person) is scheduled to be present at the premises at the current time, then decision 925 branches to "yes" branch 945 whereupon, at step 950, the active monitor settings (actions) corresponding to the registered object are retrieved from active monitor settings memory area 720 according to the current timestamp. Returning to decision 910, if the object sensed by the electronic multi-touch floor covering does not match any of the registered objects, then decision 910 branches to "no" branch 935 whereupon, at step 940, any active monitor settings (actions) used for unregistered objects at the current time and date are retrieved from active monitor settings memory area 720.

After any applicable settings (actions) have been retrieved for the object (either registered or unregistered), the actions are preformed by the system at step 955 (e.g., sound an alarm for unregistered object, turn on lights or unlock doors for registered object, etc.). In one embodiment, at step 960, object inactivity is sensed, such as a person lying prone on the floor. In one embodiment, also at step 960, the current health status of the object is retrieved, if possible, such as using a heart-rate monitor or other such device. A determination is made, based on the data received in step 960, as to whether the object might need assistance (decision 965). For example, an elderly person may have fallen on the floor and cannot get up or a person may have suffered a heart attack or other possibly life-threatening incident. If a health alert is detected, then decision 965 branches to "yes" branch 970 whereupon, at step 975 appropriate action is taken (e.g., contact emergency medical services (EMS), sound alarm, notify a caretaker, etc.). On the other hand, if no health alert is detected, then decision 965 branches to "no" branch 980 and processing returns to the calling routine (see, e.g., FIG. 8) at 995.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by a computer system, the method comprising:

identifying a shape of an object in contact with an electronic multi-touch floor covering, wherein the multi-touch floor covering includes a plurality of sensors that identify shapes of objects in contact with a surface of the electronic multi-touch floor covering;

retrieving an entity record from a first computer system data store, wherein the retrieved entity record corresponds to the identified shape;

retrieving one or more actions from a second computer system data store, wherein the one or more actions corresponds to the retrieved entity record;

sensing a plurality of objects in contact with the multi-touch floor covering;

counting the plurality of sensed objects, the counting resulting in a total number of objects;

comparing the total number of objects with one or more group threshold values; and performing one or more group threshold actions in response to the total number of objects exceeds one or more group threshold values.

2. An information handling system comprising:

one or more processors;

a memory accessible by at least one of the processors;

one or more nonvolatile storage areas accessible by at least one of the processors;

an electronic multi-touch floor covering that is an input device accessible by at least one of the processors, wherein the multi-touch floor covering includes a plurality of sensors that identify shapes of objects in contact with a surface of the electronic multi-touch floor covering;

a set of instructions stored in the memory and executed by at least one of the processors in order to perform actions of:

identifying a shape of an object in contact with the electronic multi-touch floor covering;

retrieving an entity record from a first computer system data store that is stored on one of the nonvolatile storage areas, wherein the retrieved entity record corresponds to the identified shape;

retrieving one or more actions from a second computer system data store that is stored on one of the nonvolatile storage areas, wherein the one or more actions corresponds to the retrieved entity record;

sensing a plurality of objects in contact with the multi-touch floor covering;

counting the plurality of sensed objects, the counting resulting in a total number of objects;

comparing the total number of objects with one or more group threshold values; and performing one or more group threshold actions in response to the total number of objects exceeds one or more group threshold values.

3. A computer program product stored in a computer readable storage device, comprising functional descriptive material that, when executed by an information handling system, causes the information handling system to perform actions that include:

identifying a shape of an object in contact with an electronic multi-touch floor covering, wherein the multi-touch floor covering includes a plurality of sensors that identify shapes of objects in contact with a surface of the electronic multi-touch floor covering;

retrieving an entity record from a first computer system data store, wherein the retrieved entity record corresponds to the identified shape;

retrieving one or more actions from a second computer system data store, wherein the one or more actions corresponds to the retrieved entity record;

sensing a plurality of objects in contact with the multi-touch floor covering;

counting the plurality of sensed objects, the counting resulting in a total number of objects;

comparing the total number of objects with one or more group threshold values; and performing one or more group threshold actions in response to the total number of objects exceeds one or more group threshold values.

* * * * *